US006109540A

United States Patent [19]

Coldren et al.

[11] Patent Number: 6,109,540

[45] Date of Patent: Aug. 29, 2000

[54] OUTWARDLY OPENING NOZZLE VALVE FOR A FUEL INJECTOR

[75] Inventors: Dana R. Coldren, Fairbury; John D. Manahan, Bloomington; Adrian Hsieh, Normal, all of Ill.

[73] Assignee: Caterpillar Inc., Peoria, Ill.

[21] Appl. No.: 09/182,372

[22] Filed: Oct. 29, 1998

[51] Int. Cl.[7] .......... B29C 45/20

[52] U.S. Cl. .......... 239/87

[58] Field of Search .......... 239/82, 453, 459, 239/533.3, 533.12

[56] References Cited

U.S. PATENT DOCUMENTS

| | | | |
|---|---|---|---|
| 1,995,459 | 3/1935 | Olsen | 239/87 |
| 2,135,925 | 11/1938 | Tuscher | 239/87 X |
| 2,244,394 | 6/1941 | Hautzenroeder . | |
| 2,317,618 | 4/1943 | King . | |
| 2,595,639 | 5/1952 | Chmura et al. . | |
| 2,699,358 | 1/1955 | Sonderegger . | |
| 2,796,058 | 6/1957 | Perkins | 239/87 |
| 2,935,264 | 5/1960 | Napoli | 239/87 |
| 3,136,305 | 6/1964 | Kenworthy | 239/453 X |
| 3,339,848 | 9/1967 | Creiger . | |
| 3,373,943 | 3/1968 | Roosa . | |
| 3,812,829 | 5/1974 | McCormick . | |
| 4,153,205 | 5/1979 | Parrish, Jr. . | |
| 4,499,861 | 2/1985 | Wiegand et al. . | |
| 4,583,687 | 4/1986 | Gaskell . | |
| 4,691,864 | 9/1987 | Greeves . | |
| 4,823,756 | 4/1989 | Ziejewski et al. . | |
| 4,867,128 | 9/1989 | Ragg et al. . | |
| 4,941,613 | 7/1990 | Hardy et al. . | |
| 5,110,054 | 5/1992 | Stevens . | |
| 5,127,584 | 7/1992 | Sczomak . | |
| 5,282,577 | 2/1994 | Neitz . | |
| 5,497,947 | 3/1996 | Potz et al. . | |
| 5,522,550 | 6/1996 | Potz et al. . | |

FOREIGN PATENT DOCUMENTS

| | | | |
|---|---|---|---|
| 683026 | 7/1962 | Canada | 239/87 |
| 927050 | 8/1960 | United Kingdom . | |
| 2113303 | 1/1982 | United Kingdom . | |
| 2096702 | 3/1982 | United Kingdom . | |
| WO 86/00668 | 7/1985 | WIPO . | |

*Primary Examiner*—Kevin Weldon
*Attorney, Agent, or Firm*—Michael B. McNeil

[57] ABSTRACT

A fuel injector comprises an injector body which defines a nozzle chamber that is separated from a plurality of outlet orifices by a conical valve seat. An outwardly opening valve member, which is at least partially positioned in the injector body, includes a closing hydraulic surface exposed to fluid pressure outside the injector body. The valve member is movable between a closed position, in which the conical valve seat is closed, and an open position.

20 Claims, 2 Drawing Sheets

OUTWARDLY OPENING NOZZLE VALVE FOR A FUEL INJECTOR

TECHNICAL FIELD

The present invention relates generally to fuel injectors and more particularly to fuel injectors with outwardly opening nozzle valves.

BACKGROUND ART

Most present fuel injectors utilize inwardly opening valve members to create a flow path from the injector body into a combustion chamber. One example of a commonly used inwardly opening valve member is described in U.S. Pat. No. 5,522,545 to Camplin et al. The Camplin hydraulically-actuated fuel injector includes a valve member which is biased toward an downward, closed position by a biasing spring. At the initiation of the injection event, high pressure fuel surrounds the valve member and acts on a lifting hydraulic surface of the valve member. When the pressure of the fuel reaches a valve opening pressure, the valve member can move upward, and thus farther inward, against the action of the biasing spring to open a flow path from the fuel injector into the combustion chamber. While the inwardly opening valve member has performed well in fuel injectors, performance of the fuel injectors can sometimes be improved upon and some occasional problems with inwardly opening valve members can be addressed.

There are a few problems that sometimes arise from use of an inwardly opening valve member that can be dramatically reduced with replacement by an outwardly opening valve member. For instance, high combustion chamber pressures can occasionally force undesirable gasses and fluids from the engine cylinder into the fuel injector at the end of the injection event. While this gas ingestion does not occur frequently, when it does occur it is detrimental to injector performance. It is therefore desirable to reduce the likelihood of this gas ingestion. Further, the high tip stress that is created at the end of the injection event caused by impact loading can sometimes lead to tip breakage. This can occur because the impact loads created by the inwardly opening valve member are directed at the thin tip portion of the fuel injector. If the tip becomes weakened from the forces exerted on it by the valve member during the life of the fuel injector, there is a potential for tip breakage which would be fatal to the fuel injector. Therefore, it is desirable to have the impact stress absorbed by the larger portion of the metal component. Finally, it is well known in the art that it is desirable to create the most abrupt stop to the injection event possible in order to reduce noise and emissions created by engines. While the inwardly opening fuel injector has performed well in this regard, the technology can be improved upon to create even better results.

The present invention is directed to overcoming one or more of the problems set forth above and to improving the performance of fuel injector valve members.

DISCLOSURE OF THE INVENTION

A fuel injector comprises an injector body which defines a nozzle chamber that is separated from a plurality of outlet orifices by a conical valve seat. A valve member, which is at least partially positioned in the injector body, includes a closing hydraulic surface exposed to fluid pressure outside the injector body. The valve member is movable between a closed position, in which the conical valve seat is closed, and an open position.

BEST MODE FOR CARRYING OUT THE INVENTION

Figure 1:
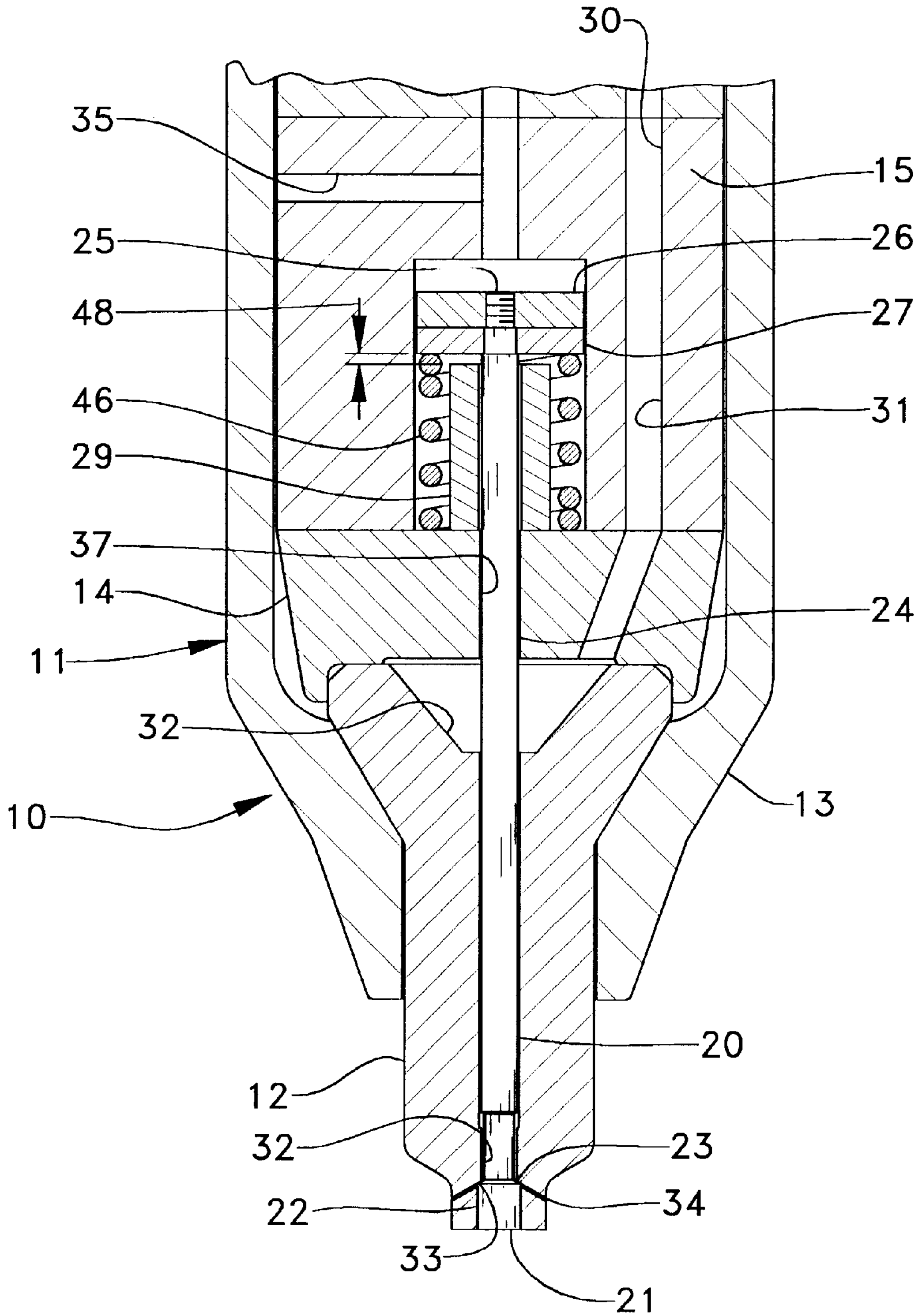
FIG. 1 is a diagrammatic cross-section of the nozzle portion of a fuel injector according to the present invention.
Figure 2:
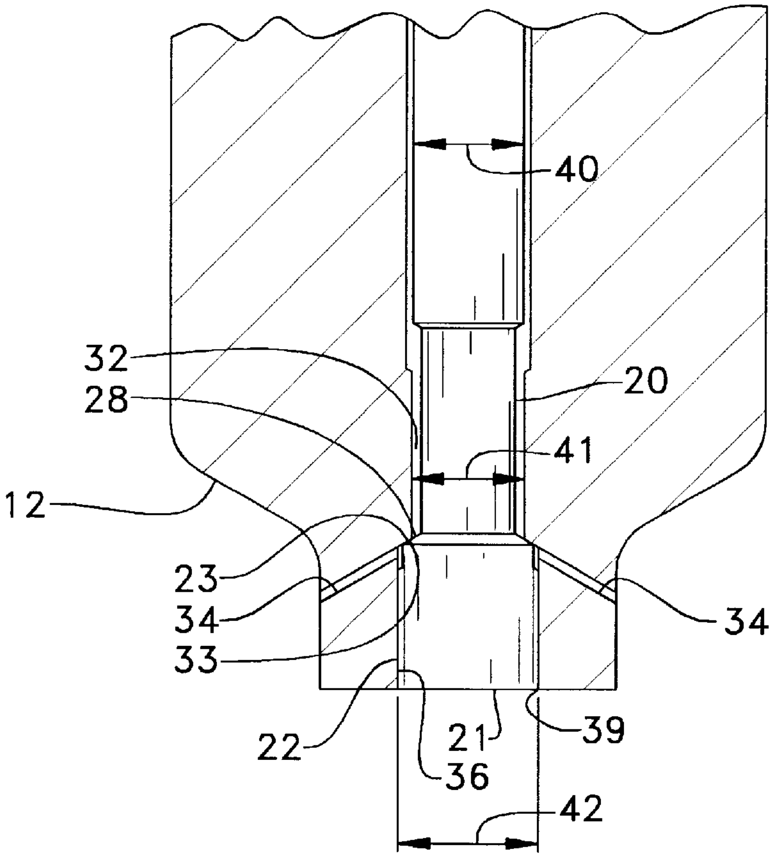
FIG. 2 is a diagrammatic cross-section of the lower portion of the valve member of the fuel injector in FIG. 1.

Referring now to FIGS. 1 and 2, a fuel injector 10 includes an injector body 11 which contains various components that are positioned as they would be just prior to an injection event. In particular, injector body 11 includes a casing 13 which contains a tip 12, a check guide 14 and a spring cage 15. The spring cage 15 defines a high pressure fuel inlet 30 and a low pressure passage 35. During an injection event, pressurized fuel travels from a fuel pressurization chamber (not shown) to a nozzle chamber 32 through a nozzle supply passage 31 from high pressure fuel inlet 30. Contained within spring cage 15 is a biasing spring 46 which acts to bias a valve member 20 to a closed, inward, or upward, position between injection events. Valve member 20 includes an attachment end 25, adjacent spring cage 15, and a closing hydraulic surface end 21, which is exposed to fluid pressure in the combustion space, outside of injector body 11.

During an injection event, the valve member 20 advances downward from the inward, closed position to an outward, open position. The distance between the closed and open positions is defined in part by a nut 26 and a cylindrical check lift spacer 29. The nut 26 is secured to attachment end 25 of valve member 20 and is separated from biasing spring 46 by a spring shim spacer 27 which is located below nut 26. The cylindrical check lift spacer 29 is positioned around valve member 20 below spring shim spacer 27. Because the central bore is larger than the outer diameter of valve member 20, but less than the spring shim spacer 27 and the cylindrical check lift spacer 29, the components can be assembled without a slot in the stop component. The distance between cylindrical check lift spacer 29 and spring shim spacer 27 is defined as a lift distance 48.

The valve member 20 includes an upper guide portion 24 and a lower guide portion 22. Upper guide portion 24 has an upper check guide diameter 40. During an injection event, upper guide portion 24 moves within an upper guide bore 37, defined by check guide 14. Check guide diameter 40 is only slightly less than the diameter of upper guide bore 37. Lower guide portion 22 moves within a lower guide bore 36 during the injection event. Lower guide bore 36 is defined by tip 12 to have a tip guide diameter 42 which is greater than upper check guide diameter 40. When valve member 20 is in the closed position closing hydraulic surface end 21 is preferably about flush with a bottom edge 39 of the lower guide bore 36. It is desirable for the closing hydraulic surface end 21 to be approximately flush with bottom edge 39 to enhance performance of fuel injector 10. For instance, if closing hydraulic surface 21 was seated above bottom edge 39, sediments from the combustion space could build up along bottom edge 39, thus hindering the ability of valve member 20 to open outward. Similarly, if closing hydraulic surface 21 were seated below bottom edge 39, sediments from the combustion space could build up on valve member 20, once again hindering the performance of fuel injector 10. Tip 12 also defines a conical valve seat 33 to have a seat diameter 41 which is less than tip guide diameter 42 but greater than upper check guide diameter 42.

Assembly of fuel injector 10 is simplified by the relationship of the diameters set out above. Valve member 20 can be inserted through the bottom of tip 12. Once valve member 20 is in place, check lift spacer 29 can be positioned adjacent attachment end 25. Biasing spring 46 can then be placed around check lift spacer 29 and valve member 20, spring shim spacer 27 can be inserted above biasing spring 46, and nut 26 can be positioned atop spring shim spacer 27. Finally, spring cage 15 is lowered around the assembly. Once again, because the central bore is larger than spring shim spacer 27 and check lift spacer 29, there is no need to place a slot in the stop component for assembly.

The movement of valve member 20 during an injection event is controlled in part by the fuel pressure within nozzle chamber 32. When pressure within the nozzle chamber 32 exceeds a valve opening pressure, the pressure force on opening hydraulic surface 28 allows valve member 20 to advance against the action of biasing spring 46 toward the outward, open position. When pressure within nozzle chamber 32 falls below a valve closing pressure, the pressure on valve member 20 is no longer sufficient for it to remain in the open position against the action of biasing spring 46 and therefore, valve member 20 returns to the closed position.

The difference between the valve opening pressure and the valve closing pressure for outwardly opening valve member 20 is proportional to the difference in the area exposed to injection pressure when valve member 20 is in the inward, closed position and when it is in the outward, open position. However, these pressures are variable depending on the pressure acting upon closing hydraulic surface 21. For instance, when valve member 20 is open, the pressure is relatively high and when valve member 20 is closed the pressure is relatively low. When valve member 20 is in the closed position, the valve opening pressure for fuel injector 10 is related to the difference in area between the upper check guide diameter 40 and the seat diameter 41. When valve member 20 is in the open position, the valve closing pressure is related to the difference in area between the upper check guide diameter 40 and the tip guide diameter 42. Biasing spring 46 is therefore sized based on these areas to yield the desired valve opening pressure and valve closing pressure for fuel injector 10.

Figure 3:
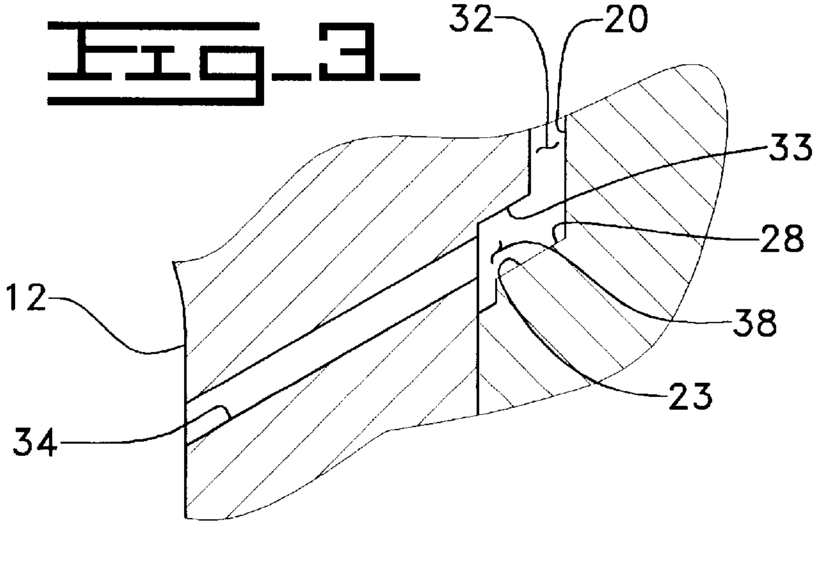
FIG. 3 is a diagrammatic cross-section of the nozzle outlet orifices area of the fuel injector in FIG. 1.

Referring now to FIG. 3, tip 12 defines a plurality of nozzle outlet orifices 34 which are organized in a circular fashion, separated from nozzle chamber 32 by conical valve seat 33. Valve member 20 includes a conical valve surface 23 is in contact with conical valve seat 33 when valve member 20 is in the inward, closed position. Valve member 20 also includes an opening hydraulic surface 28 which is exposed to fluid pressure in nozzle chamber 32. When valve member 20 is in the open position, conical valve seat 33 is no longer in contact with conical valve surface 23 and together they define a flow path 38 which connects the nozzle outlet orifices 34 to nozzle chamber 32.

INDUSTRIAL APPLICABILITY

Prior to the start of an injection event, opening hydraulic surface 28 is exposed to low pressure in nozzle chamber 32 and valve member 20 is seated in the inward, closed position. The closing hydraulic surface end 21 of valve member 20 is flush with bottom edge 39 of lower guide bore 36, conical valve surface 23 is in contact with conical valve seat 33, and opening hydraulic surface 28 is in contact with lower guide bore 36. At the start of the injection event, high pressure fuel inlet 30 is exposed to the source of high pressure fuel. As the injection event progresses, the pressure of the fuel within nozzle chamber 32 begins to rise. The high pressure fuel flows into nozzle chamber 32 through a nozzle supply passage 31 via high pressure fuel inlet 30. Because valve member 20 is still seated in the inward, closed position the high pressure fuel entering nozzle chamber 32 is unable to spray into the combustion chamber and the pressure within nozzle chamber 32 continues to rise.

Once the fuel pressure within nozzle chamber 32 exceeds the valve opening pressure, the pressure force acting on opening hydraulic surface 28 of valve member 20 is sufficient to push it downward and outward against the action of biasing spring 46. As valve member 20 advances to its open position, conical valve surface 23 advances downward away from contact with conical valve seat 33. When conical valve surface 23 is no longer in contact with conical valve seat 33, a flow path 38 is created between conical valve surface 23 and conical valve seat 33 fluidly connecting nozzle chamber 32 to the combustion chamber. High pressure fuel can then flow from nozzle chamber 32 through nozzle outlet orifices 34 and spray into the combustion chamber for the remainder of the injection event.

Just prior to the end of the injection event, pressure within the fuel pressurization chamber beings to decrease in a manner well known in the art. Once the pressure within the fuel pressurization chamber falls below the valve closing pressure, the pressure force acting on valve member 20 is no longer sufficient to overcome the action of biasing spring 46 and it returns inward to its biased, closed position. Valve member 20 is assisted in its return to the closed position by the cylinder pressure in the combustion chamber acting on closing hydraulic surface 28. As valve member 20 returns to its closed position and conical valve surface 23 returns to contact with conical valve seat 33 thus closing flow path 38 and ending the injection event. When valve member 20 returns to the inward, closed position, the impact force is directed upward toward the structurally robust portion of tip 12. This is unlike the conventional inwardly opening valve member which closes downward and directs the impact force toward the thin portion of the tip. For this reason, the present invention is capable of absorbing much greater impact loads than the prior art inwardly opening valve member, thus reducing the likelihood of tip breakage.

The valve opening pressure and valve closing pressure for the outwardly opening valve member 20 of the present invention each have directly proportional relationships to the engine cylinder pressure. This is unlike the conventional nozzle design which has inversely proportional relationships for these pressures. Therefore, in the present invention, as compression pressure within the engine cylinder increases, the valve opening pressure of the outwardly opening valve member 20 increases. This phenomenon be exploited to create higher injection pressures at the beginning of the injection event. Further, the present invention can utilize the engine cylinder pressure to help seal valve member 20 in the upward, closed position at the end of the injection event. Because the high pressure within the cylinder helps to close valve member 20, there is a more abrupt, and therefore more desirable, end to the injection event. This more abrupt end of the injection event can allow for a reduction of engine noise and emissions over the prior art. Finally, because valve member 20 opens outward into the combustion chamber, the likelihood of gas ingestion during the injection event is virtually eliminated.

It should be understood that the above description is intended only to illustrate the concepts of the present invention, and is not intended to in any way limit the potential scope of the present invention. For instance, the size or shape of the nozzle outlet orifices could be altered to meet the specific needs of a particular fuel injection system. Further, it should be appreciated that this invention has application in multiple types of fuel injectors, including hydraulically-actuated fuel injectors or cam driven fuel injectors. Thus, various modifications could be made without departing from the intended spirit and scope of the invention as defined by the claims below.

What is claimed is:

1. A fuel injector comprising:

an injector body defining a nozzle chamber separated from a plurality of outlet orifices by a conical valve seat;

a valve member at least partially positioned in said injector body and including a closing hydraulic surface exposed to fluid pressure outside said injector body, and being movable between a closed position in which said conical valve seat is closed and an open position; and said valve member being movable a distance between said closed position and said open position, wherein said distance is defined at least in part by a check lift spacer positioned to contact said valve member when in said open position.

2. The fuel injector of claim 1 wherein said valve member includes a conical valve surface that contacts said conical valve seat when said valve member is in said closed position; and said conical valve seat and said conical valve surface defining a portion of a flow path connecting said outlet orifices to said nozzle chamber when said valve member is in said open position.

3. The fuel injector of claim 1 further comprising a spring operably positioned in said injector body to bias said valve member toward said closed position.

4. The fuel injector of claim 1 wherein said injector body defines a guide bore at one end that opens to said nozzle chamber; and a portion of said valve member adjacent said closing hydraulic surface being positioned in said guide bore.

5. The fuel injector of claim 1 wherein said conical valve seat is located in said injector body.

6. The fuel injector of claim 1 wherein said valve member includes a conical valve surface that contacts said conical valve seat when said valve member is in said closed position; and said conical valve surface defining a portion of a flow path between said outlet orifices and said nozzle chamber when said conical valve surface is away from contact with said conical valve seat.

7. The fuel injector of claim 1 wherein said injector body defines an upper guide bore with a first diameter and a lower guide bore with a second diameter; and said conical valve seat has a seat diameter that is less than said second diameter but greater than said first diameter.

8. The fuel injector of claim 1 wherein said injector body defines a lower guide bore with a bottom edge; and one end of said valve member is about flush with said bottom edge when said valve member is in said closed position.

9. The fuel injector of claim 1 wherein said check lift spacer surrounds said valve member; and said distance is defined at least in part by a nut attached to one end of said valve member above said check lift spacer.

10. A fuel injector comprising:

an injector body defining a nozzle chamber separated from a plurality of outlet orifices by a conical valve seat;

a valve member at least partially positioned in said injector body and including a conical valve surface, and being movable between a closed position in which said conical valve surface is in contact with said conical valve seat, and an open position;

said conical valve surface defining a portion of a flow path between said outlet orifices and said nozzle chamber when said conical valve surface is away from contact with said conical valve seat; and said valve member being movable a distance between said closed position and said open position, wherein said distance is defined at least in part by a check lift spacer positioned to contact said valve member when in said open position.

11. The fuel injector of claim 10 wherein said valve member has a closing hydraulic surface exposed to fluid pressure outside said injector body.

12. The fuel injector of claim 11 wherein said conical valve seat is located in said injector body.

13. The fuel injector of claim 12 wherein said injector body defines an upper guide bore with a first diameter and a lower guide bore with a second diameter; and said conical valve seat has a seat diameter that is less than said second diameter but greater than said first diameter.

14. The fuel injector of claim 12 wherein said injector body defines a lower guide bore with a bottom edge; and one end of said valve member is about flush with said bottom edge when said valve member is in said closed position.

15. The fuel injector of claim 12 wherein said check lift spacer surrounds around said valve member; and said distance is defined at least in part by a nut attached to one end of said valve member above said check lift spacer.

16. The fuel injector of claim 15 wherein said conical valve seat and said conical valve surface defining a portion of said flow path connecting said outlet orifices to said nozzle chamber when said valve member is in said open position.

17. The fuel injector of claim 12 wherein said injector body defines a guide bore at one end that opens to said nozzle chamber; and a portion of said valve member adjacent said closing hydraulic surface being positioned in said guide bore.

18. A fuel injector comprising:

an injector body defining a nozzle chamber separated from a plurality of outlet orifices by a conical valve seat;

a valve member at least partially positioned in said injector body and including a conical valve surface, and being movable between a closed position in which said conical valve surface is in contact with said conical valve seat, and an open position in which said conical valve seat and said conical valve surface define a portion of a flow path connecting said outlet orifices to said nozzle chamber;

said conical valve seat being located in, said injector body;

said valve member having a closing hydraulic surface exposed to fluid pressure outside said injector body; and said valve member being movable a distance between said closed position and said open position, wherein said distance is defined at least in part by a check lift spacer positioned to contact said valve member when in said open position.

19. The fuel injector of claim 18 wherein said injector body defines an upper guide bore with a first diameter and a lower guide bore with a second diameter; and said conical valve seat has a seat diameter that is less than said second diameter but greater than said first diameter.

20. The fuel injector of claim 19 wherein said lower guide bore has a bottom edge; and one end of said valve member is about flush with said bottom edge when said valve member is in said closed position.

* * * * *